US007051677B2

(12) United States Patent
Van Epps, II et al.

(10) Patent No.: US 7,051,677 B2
(45) Date of Patent: May 30, 2006

(54) NESTABLE LIVESTOCK WATERING TANK WITH STACKING BLOCKS AND REINFORCED SUPPORTS

(75) Inventors: James L. Van Epps, II, Portage, WI (US); Lynn Van Epps, Portage, WI (US)

(73) Assignee: Freeland Industries, Inc, Portage, WI (US)

( * ) Notice: Subject to any disclaimer, the term of this patent is extended or adjusted under 35 U.S.C. 154(b) by 0 days.

(21) Appl. No.: 10/939,712

(22) Filed: Sep. 13, 2004

(65) Prior Publication Data

US 2006/0054094 A1    Mar. 16, 2006

(51) Int. Cl.
*A01K 7/04* (2006.01)

(52) U.S. Cl. ......................................... 119/78; 206/501
(58) Field of Classification Search ................... 119/78, 119/72, 73, 74, 51.5; 206/499, 501, 503, 206/504, 505, 506, 513, 514, 515; 220/23.83
See application file for complete search history.

(56) References Cited

U.S. PATENT DOCUMENTS

| 1,062,792 | A | * | 5/1913 | Nelson | 119/78 |
| 1,689,217 | A | * | 10/1928 | White | 206/506 |
| 2,765,099 | A | * | 10/1956 | Lively | 206/506 |
| 2,954,914 | A | * | 10/1960 | Herlihy | 229/117.17 |
| 3,117,692 | A | * | 1/1964 | Carpenter et al. | 206/508 |
| 3,498,494 | A | * | 3/1970 | Voorhees, Jr. | 206/501 |
| 4,082,184 | A | * | 4/1978 | Hammer | 206/519 |
| 4,106,623 | A | * | 8/1978 | Carroll et al. | 206/506 |
| 4,274,365 | A | * | 6/1981 | Peters | 119/78 |
| 4,354,600 | A | * | 10/1982 | Treiber | 206/508 |
| D268,622 | S | * | 4/1983 | Wolters et al. | D3/314 |
| 4,660,734 | A | * | 4/1987 | Heaney et al. | 220/657 |
| 4,664,347 | A | * | 5/1987 | Brown et al. | 248/97 |
| 4,720,013 | A | * | 1/1988 | Nichols et al. | 206/506 |

(Continued)

FOREIGN PATENT DOCUMENTS

EP    0 442 815 A1 *  8/1991

*Primary Examiner*—Yvonne R. Abbott
(74) *Attorney, Agent, or Firm*—Ezra Sutton, Esq.

(57) ABSTRACT

A livestock watering tank being used for receiving water for feeding livestock, the tank includes first and second sidewalls, a top, an upper rim wall and a bottom, the tank being formed of molded plastic to prevent corrosion. The tank includes a float valve for controlling the supply of water from the tank to the drinking tray. The tank is shaped so as to be nestable with another tank and includes a first pair of nesting members formed on the first sidewall of the tank, and a second pair of nesting members formed on the second sidewall of the tank, and the first and second pairs of nesting members each having nesting surfaces on their lower edges for engaging and resting on the upper rim wall of another tank in order to allow the tank to nest within another tank and to space the tops of the tanks apart a predetermined amount. The upper rim wall of the tank has a first U-shaped channel extending between the first pair of nesting members, and a second U-shaped channel extending between the second pair of nesting members. The first and second U-shaped channels having therein first and second longitudinal support members extending between the first and second pairs of nesting members, respectively, and each being adjacent to the first and second sidewalls of the tank, respectively, in order to provide increased structural integrity and nestability of the tank when nesting two or more of the tanks with each other.

24 Claims, 3 Drawing Sheets

U.S. PATENT DOCUMENTS

| | | | | |
|---|---|---|---|---|
| 4,765,480 A | * | 8/1988 | Malmanger | 206/506 |
| 4,804,092 A | * | 2/1989 | Jones | 206/519 |
| 4,828,112 A | * | 5/1989 | Vollrath et al. | 206/519 |
| 4,919,267 A | * | 4/1990 | Stoll | 206/507 |
| 4,967,908 A | * | 11/1990 | Kessler | 206/518 |
| 5,062,539 A | * | 11/1991 | Chandler | 220/4.27 |
| 5,113,800 A | * | 5/1992 | Van Epps et al. | 119/78 |
| 5,131,708 A | * | 7/1992 | Denzin | 294/168 |
| 5,279,443 A | * | 1/1994 | Koda et al. | 220/769 |
| 5,322,213 A | * | 6/1994 | Carter et al. | 229/166 |
| 6,463,880 B1 | * | 10/2002 | Callingham | 119/78 |
| 6,568,534 B1 | * | 5/2003 | Zank | 206/508 |
| 6,708,824 B1 | * | 3/2004 | Sahm, III | 206/505 |
| 6,874,650 B1 | * | 4/2005 | Welsh et al. | 220/519 |
| 2003/0024844 A1 | * | 2/2003 | Hammett | 206/505 |

* cited by examiner

NESTABLE LIVESTOCK WATERING TANK WITH STACKING BLOCKS AND REINFORCED SUPPORTS

FIELD OF THE INVENTION

The present invention relates to a nestable livestock watering tank which is formed of molded plastic to prevent corrosion. More particularly, the livestock watering tank includes stacking blocks having reinforced support members for increased structural integrity and nestability of two or more of the livestock watering tanks with each other.

BACKGROUND OF THE INVENTION

Typically, livestock watering tanks have been made of metal, which have a tendency to corrode over time and are difficult to clean. Also, such tanks cannot be disassembled, which add to the difficulty in cleaning. As a result, metal watering tanks have a tendency to build up bacteria and transmit diseases to the animals drinking from them. In addition, such metal livestock watering tanks were heavy and not conducive to multiple stacking with each other.

There remains a need for a nestable livestock watering tank made from a moldable plastic material having stacking blocks with reinforced support members being integrally connected or attached to the sidewalls/rim of the watering tank. The stacking blocks and the reinforced support members will provide for increased structural integrity and nestability of two or more of the livestock watering tanks with each other. Further, the reinforced support members will provide for increased nesting capability of watering tanks having a per tank weight of greater than 300 pounds without structurally failing, buckling or crushing of the nestable watering tanks when nesting with each other.

DESCRIPTION OF THE PRIOR ART

Livestock watering tanks having various designs, structures, styles and materials of construction have been disclosed in the prior art. For example, U.S. Pat. No. 5,113,800 to VAN EPPS, II et al. discloses a livestock watering tank having a main tank and a drinking tray disposed below the main tank. Both the main tank and the drinking tray are formed of molded plastic to prevent corrosion and for easy cleaning. The tanks are nestable for easy shipping and storage. This prior art patent does not disclose or teach the structure of the present invention of a nestable livestock watering tank having stacking blocks with reinforced support members.

None of the prior art references teach stacking blocks having reinforced support members for increased structural strength and integrity for nesting of two or more livestock watering tanks without structural failure, buckling or crushing of the nestable livestock watering tanks.

Accordingly, it is an object of the present invention to provide a nestable livestock watering tank that includes a plurality of stacking blocks having reinforced support members therebetween for increased structural strength, integrity and nestability of two or more livestock watering tanks when nesting with each other.

Another object of the present invention is to provide a nestable livestock watering tank wherein the reinforced support members increases the nesting capability of livestock watering tanks having a per tank weight of greater than 300 pounds without structurally failing, buckling or crushing of two or more nestable watering tanks when nesting with each other.

Another object of the present invention is to provide a nestable livestock watering tank wherein the reinforced support members are connected to an upper rim or to each of the sidewalls of the watering tank for increased structural integrity of the livestock watering tank in order to prevent structural failure when nesting two or more watering tanks with each other.

Another object of the present invention is to provide a nestable livestock watering tank that employs reinforced support members to further strengthen the sidewalls of the tank when it is filled with water and when the livestock crowds the sides of the tank and bump into the sides without causing any structural failure, buckling or crushing of the watering tank.

Another object of the present invention is to provide a nestable livestock watering tank that can be mass produced in an automated an economical manner and is readily affordable by the user.

SUMMARY OF THE INVENTION

In accordance with the present invention, there is provided a livestock watering tank for watering of cattle. The livestock watering tank is used for receiving water for feeding livestock having first and second sidewalls, a top, an upper rim wall and a bottom, the tank being formed of molded plastic to prevent corrosion. The drinking tray is used for livestock to drink water from, the drinking tray being formed of molded plastic and removably mounted on the bottom of the tank for quick disassembly and cleaning, the drinking tray has an outer wall substantially coextensive with one of the sidewalls of the tank, the one sidewall of the tank is indented above the drinking tray to form a recessed section for receiving an animal's head to drink from the drinking tray. The livestock watering tank includes means for supplying water from the tank to the drinking tray. The tank further includes a float valve for controlling the supply of water from the tank to the drinking tray. The tank is shaped so as to be nestable with another tank and includes a first pair of nesting members formed on the first sidewall of the tank, and a second pair of nesting members formed on the second sidewall of the tank, and the first and second pairs of nesting members each having nesting surfaces on their lower edges for engaging and resting on the upper rim wall of another tank in order to allow the tank to nest within another tank and to space the tops of the tanks apart a predetermined amount. The upper rim wall of the tank has a first U-shaped channel extending between the first pair of nesting members, and a second U-shaped channel extending between the second pair of nesting members. The first U-shaped channel having therein a first longitudinal support member extending between the first pair of nesting members and being adjacent to the first sidewall of the tank in order to provide increased structural integrity and nestability of the tank when nesting two or more of the tanks with each other; and the second U-shaped channel having therein a second longitudinal support member extending between the second pair of nesting members and being adjacent to the second sidewall of the tank in order to provide increased structural integrity and nestability of the tank when nesting two or more of the tanks with each other.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
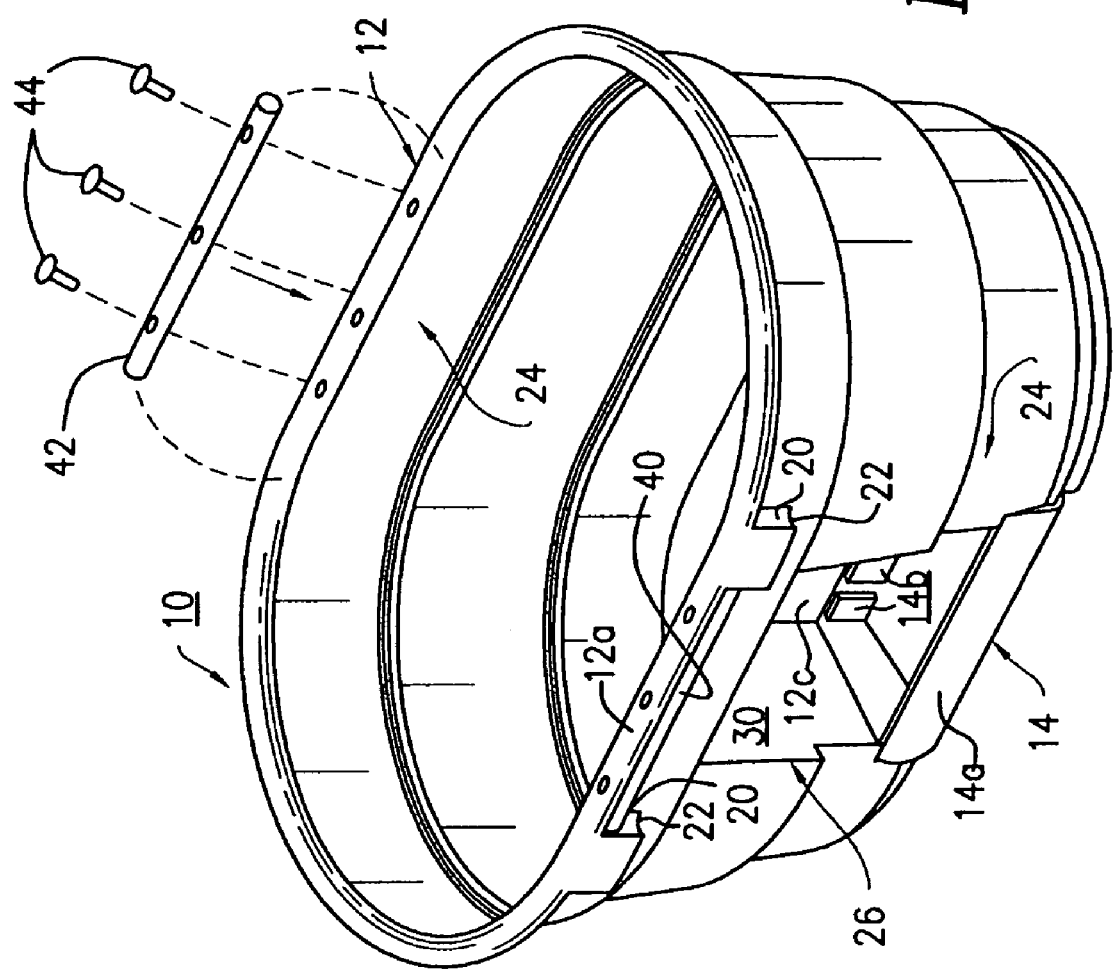
FIG. 1 is a perspective view of a nestable livestock watering tank of the preferred embodiment of the present invention showing all of the major component parts thereof.
Figure 2:
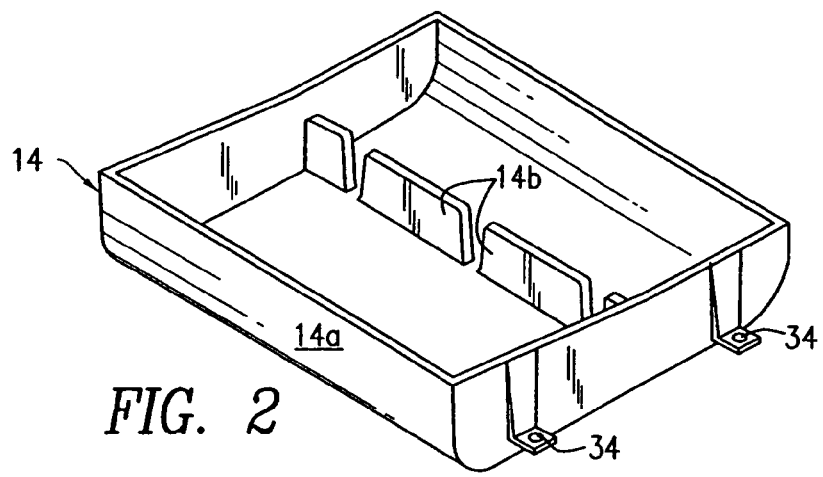
FIG. 2 is a perspective view of the nestable livestock watering tank of the present invention showing a drinking tray.

FIG. 1 shows a livestock watering tank 10 embodying the present invention, which includes a main tank 12 for receiving water for feeding livestock, a drinking tray 14 for the livestock to drink water from, a valve 18 for supplying water from main tank 12 to the livestock drinking tray 14 as needed, which includes a float valve 18 for controlling the supply of water from main tank 12 to the livestock drinking tray 14 to maintain a predetermined water level in the drinker tray.

Figure 4:
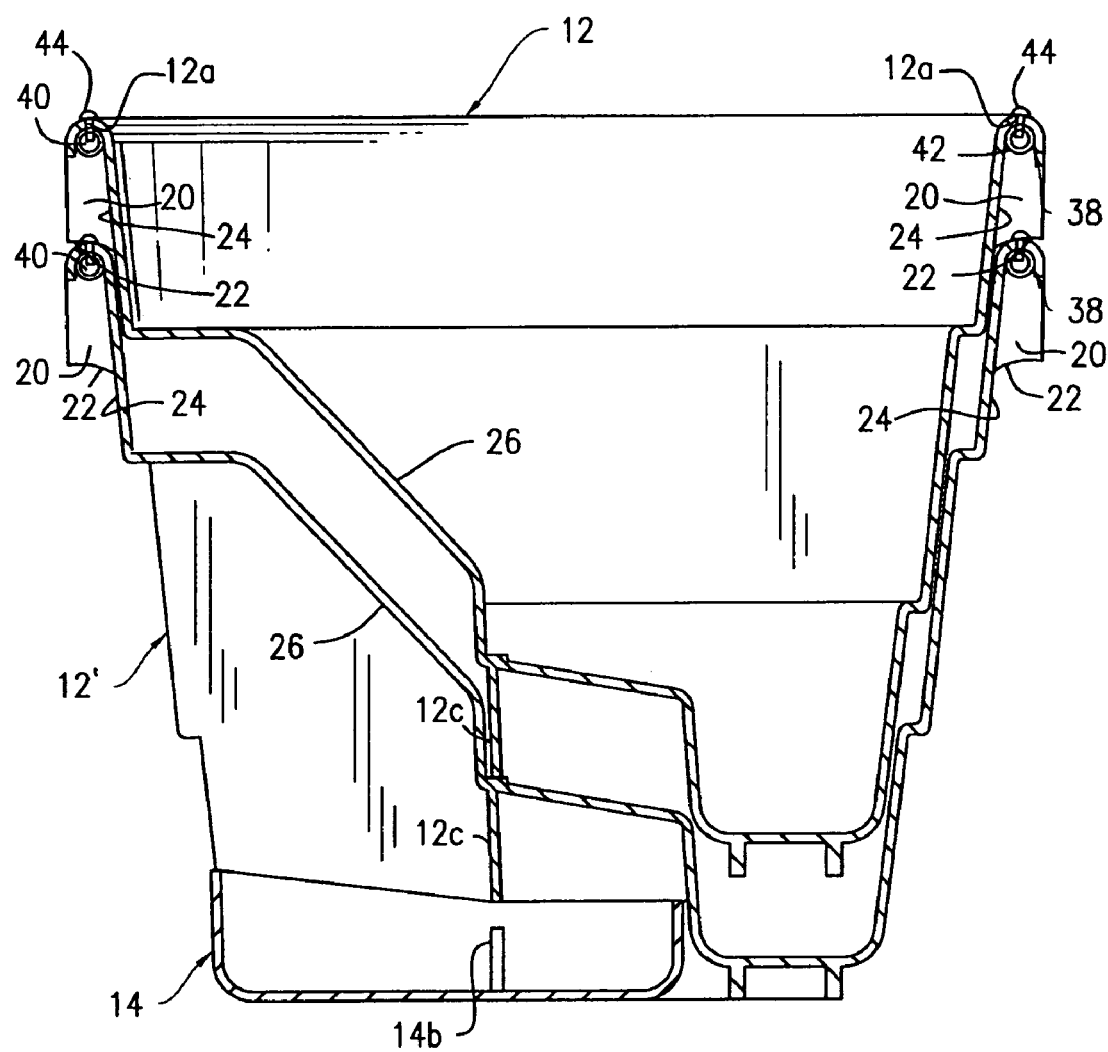
FIG. 4 is a cross-sectional view of the nestable livestock watering tank of the present invention showing two tanks in their nested arrangement.

Main tank 12 and drinking tray 14 are formed from molded plastic to resist or prevent corrosion. The preferred materials are polyethylene or structural foam. As shown in FIG. 4, main tank 12 is shaped so as to be nestable with other tanks, which makes them easy and less costly to ship and store. Tank 12 is substantially oval in shape and is provided with a curved upper wall surface 12a and integral nesting members or stacking blocks 20, with two stacking blocks being formed on each sidewall 24 of the tank 12 and adjacent the upper surface 12a. Each nesting member or stacking blocks 20 has a lower surface 22 for engaging and resting on upper curved surface 12a of tank 12. Thus, when nested, the tanks 12 and 12' are spaced apart a predetermined distance equal to the height of stacking blocks 20, which is about 4 inches.

Figure 3:
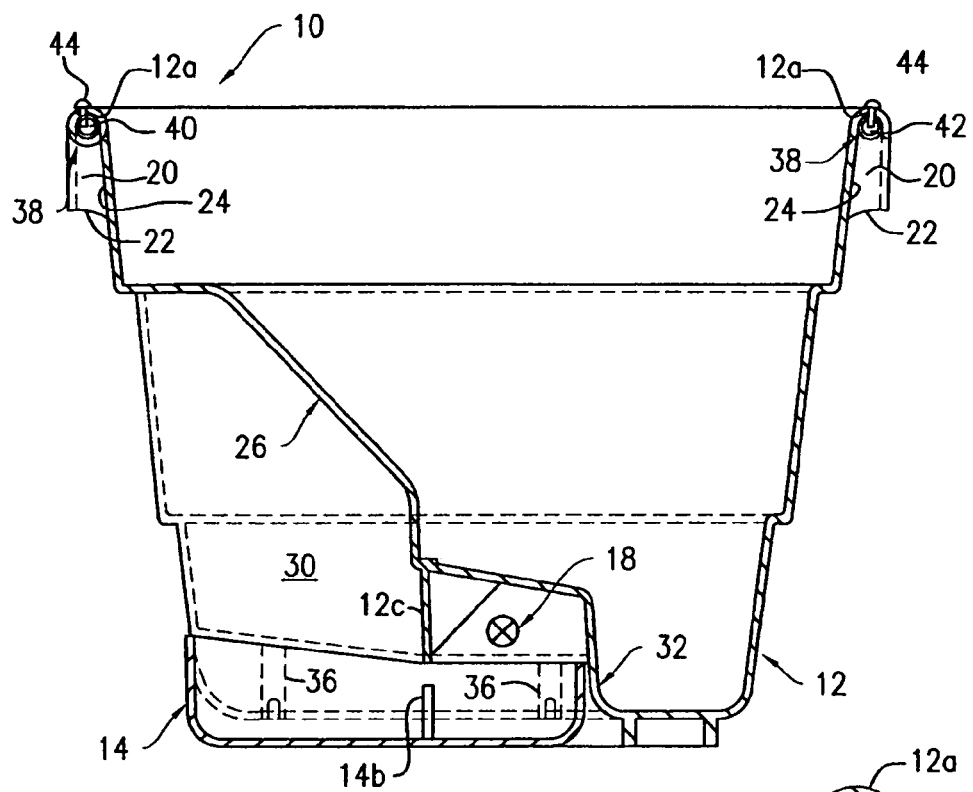
FIG. 3 is a cross-sectional view of the nestable livestock watering tank of the present invention showing the tank and drinking tray.

As shown in FIG. 3, one side of the tank 12 is indented at 26 above the livestock drinking tray 14 to form an indented section 30 for receiving an animal's head to drink from the drinking tray 14. Below section 30, the tank 12 is shaped to form a compartment 32 for receiving drinking tray 14. The livestock drinking tray 14 is shaped to slide into compartment 32 at the bottom of tank 12. Screw-receiving holes 34 are provided on drinking tray 14, which line up with screw-receiving holes 36 on the bottom of tank 12, which allow the drinking tray 14 to be bolted to tank 12 quickly and easily. When it is desired to clean tank 12 and drinking tray 14, they are quickly and easily unscrewed to disassemble the parts for a quick and thorough washing and cleaning.

The outer wall 14a of livestock drinking tray 14 is substantially flush or coextensive with sidewall 24 of tank 12. In this manner, tray 14 and the water in it is protected, and to a large extent, as this structure helps prevent the animals from dirtying the water and stepping into the drinking tray 14. Thus, the livestock drinking tray 14 cooperates with indented section 30 to provide this advantageous structural arrangement to protect the drinking tray 14 and the water in it. In addition, the drinking tray 14 includes baffles 14b which line up with baffle 12c formed on tank 12 to limit the extent to which the animal may insert its head for drinking water from the livestock drinking tray 14.

Further, the curved upper wall surface (rim) 12a of the tank 12 includes a U-shaped channel 38. The U-shaped channel 38 on each longitudinal sidewall 24 is used for receiving of a reinforced structural support member 40 and 42 therein. Each support member 40 and 42 is positioned between opposing stacking blocks 20 on along each longitudinal sidewall 24, as depicted in FIG. 3. Each support member 40 and 42 is coextensive (flush) and adjacent to sidewalls 24 and are attached to the curved upper rim wall surface 12a by a plurality of rivets 44, as depicted in FIGS. 1 and 3 of the drawings. The structural support members 40 and 42 may be shaped as a hollow circular pipe, a substantially rectangular-shaped bar member, or a substantially oval-shaped member for being received within the U-shaped channel 38 therein. Also, support members 40 and 42 may be made from construction materials such as rigid and heavy duty plastics or rust resistant metal alloys.

Figure 3A:
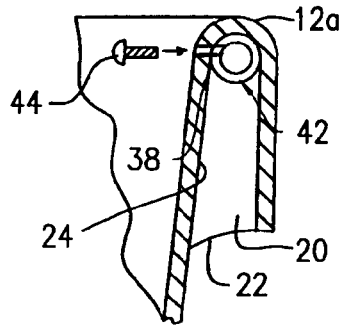
FIG. 3A is a cross-sectional view of the nestable livestock watering tank of the present invention showing a reinforced structural support member within a U-shaped channel of a curved upper wall rim.
Figure 3B:
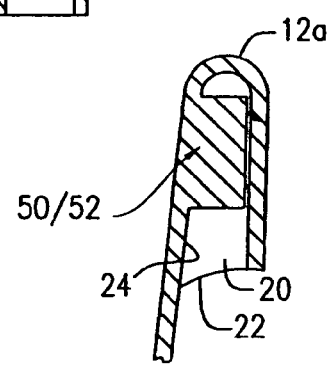
FIG. 3B is a cross-sectional view of the nestable livestock watering tank of the present invention showing an integrally attached structural support member within a U-shaped channel of the curved upper wall rim.

In an alternate design, the support members 40 and 42 are attached to the opposing sidewalls 24 by a plurality of rivets 44, as depicted in FIG. 3A. Heavy duty plastic materials include polypropylene polyethylene, teflon, nylon and the like. Rust resistant metal alloys include steel, stainless steel, aluminum and the like. In the preferred embodiment, the structural support members 40 and 42 are made from 1 inch diameter, 16 gauge galvanized steel pipe having a length between 36 inches to 48 inches. In an alternate structural design, each of the support members 50 and 52 can be molded to the longitudinal sidewalls 24 as an integral part of sidewalls 24, as shown in FIG. 3B of the drawings. The reinforced support members 50 and 52 provide increased structural strength, integrity and nestability of two or more livestock watering tanks when nesting with each other. Additionally, the each of the reinforced support members 40 and 42 or 50 and 52 provide increased nesting capability of the watering tanks 12 wherein each of the tanks has a per tank weight of greater than 300 pounds without the nesting tanks structurally failing, buckling or crushing when nesting with each other, as shown in FIG. 4 of the drawings.

When in operation, the reinforced support members 40 and 42 further strengthen each of the sidewalls 24 of the tank 10 when the tank 10 is filled with water and when the cattle/livestock crowds the sides 24 of the tank 10 and bump into the sides 24 without causing any structural failure, buckling or crushing of the watering tank 10.

ADVANTAGES OF THE PRESENT INVENTION

Accordingly, an advantage of the present invention is that it provides for a nestable livestock watering tank that includes a plurality of stacking blocks having reinforced support members therebetween for increased structural strength, integrity and nestability of two or more livestock watering tanks when nesting with each other.

Another advantage of the present invention is that it provides for a nestable livestock watering tank wherein the reinforced support members increases the nesting capability of livestock watering tanks having a per tank weight of greater than 300 pounds without structurally failing, buckling or crushing of two or more nestable watering tanks when nesting with each other.

Another advantage of the present invention is that it provides for a nestable livestock watering tank wherein the reinforced support members are connected to an upper rim or to each of the sidewalls of the watering tank for increased structural integrity of the livestock watering tank in order to prevent structural failure when nesting two or more watering tanks with each other.

Another advantage of the present invention is that it provides for a nestible livestock watering tank that employs reinforced support members to further strengthen the sidewalls of the tank when it is filled with water and when the livestock crowds the sides of the tank and bump into the sides without causing any structural failure, buckling or crushing of the watering tank.

Another advantage of the present invention is that it provides for a nestable livestock watering tank that can be mass produced in an automated an economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be constructed broadly and in a manner consistent with the spirit and scope of the invention herein.

What is claimed is:

1. A livestock watering tank, comprising:
   a) a tank for receiving water for feeding livestock having first and second sidewalls, an upper rim having an interior space; and a bottom wall, said tank being formed of molded plastic to prevent corrosion;
   b) a drinking tray for livestock to drink water from, said drinking tray being formed of molded plastic and removably mounted on the bottom of said tank for quick disassembly and cleaning, said drinking tray having an outer wall substantially coextensive with one of the sidewalls of said tank, said one sidewall of said tank being indented above said drinking tray to form a recessed section for receiving an animal's head to drink from said drinking tray;
   c) means for supplying water from said tank to said drinking tray;
   d) a float valve for controlling the supply of water from said tank to said drinking tray;
   e) said tank being shaped so as to be nestable with another tank and including a first pair of spaced-apart nesting members formed on said first sidewall of said tank, and a second pair of spaced-apart nesting members formed on said second sidewall of said tank, and said first and second pairs of nesting members each having nesting surfaces on their lower edges for engaging and resting on said upper rim of another tank in order to allow said tank to nest within another tank and to space the rims of the tanks apart a predetermined amount;
   f) said interior space of said upper rim of said tank defining a first channel therein along said first sidewall extending between at least said first pair of spaced-apart nesting members; and said interior space of said upper rim of said tank defining a second channel therein along said second sidewall extending between at least said second pair of spaced-apart nesting members;
   g) said first channel having disposed in said interior space of said upper rim a first longitudinal support member extending between at least said first pair of spaced-apart nesting members and being adjacent to said first sidewall of said tank in order to provide increased structural integrity and nestability of said tank when nesting two or more of said tanks with each other;
   h) said second channel having disposed in said interior space of said upper rim a second longitudinal support member extending between at least said second pair of spaced-apart nesting members and being adjacent to said second sidewall of said tank in order to provide increased structural integrity and nestability of said tank when nesting two or more of said tanks with each other; and
   i) said first and second longitudinal support members are mounted to said upper rim by rivets screws or bolts.

2. A livestock watering tank in accordance with claim 1, wherein said first longitudinal support member is mounted within said first channel, and wherein said second longitudinal support member is mounted within said second channel.

3. A livestock watering tank in accordance with claim 1, wherein said first longitudinal support member is molded within said first channel, and wherein said second longitudinal support member is molded within said second channel.

4. A livestock watering tank in accordance with claim 1, wherein said first and second longitudinal support members are mounted to said first and second sidewalls, respectively, of said tank by rivets, screws or bolts.

5. A livestock watering tank in accordance with claim 1, wherein each of said first and second longitudinal support members is a pipe member.

6. A livestock watering tank in accordance with claim 1, wherein each of said first and second longitudinal support members is a bar-shaped member.

7. A livestock watering tank in accordance with claim 1, wherein each of said first and second longitudinal support members is a hollow and circularly-shaped member.

8. A livestock watering tank in accordance with claim 1, wherein each of said first and second longitudinal support members includes a geometrically-shaped member selected from the group consisting of a rectangularly-shaped member, a square-shaped member and ovally-shaped member.

9. A livestock watering tank in accordance with claim 1, wherein each of said first and second longitudinal support members are made from rigid and heavy duty plastic materials selected from the group consisting of polypropylene, polyethylene, teflon and nylon.

10. A livestock watering tank in accordance with claim 1, wherein each of said first and second longitudinal support members are made from rust resistant metal alloy materials selected from the group consisting of steel, stainless steel and aluminum.

11. A livestock watering tank in accordance with claim 1, wherein each of said first and second longitudinal support members has a length in the range 36 inches to 48 inches.

12. A livestock watering tank in accordance with claim 1, wherein said tank and said drinking tray are made from moldable plastic materials selected from the group consisting of polyethylene or structural foam.

13. A livestock watering tank, comprising:
   a) a tank for receiving water for feeding livestock having first and second sidewalls, an upper rim having an interior space; and a bottom wall, said tank being formed of molded plastic to prevent corrosion;
   b) a drinking tray for livestock to drink water from, said drinking tray being formed of molded plastic and removably mounted on the bottom of said tank for quick disassembly and cleaning, said drinking tray having an outer wall substantially coexistence with one of the sidewalls of said tank, said one sidewall of said tank being indented above said drinking tray to form a recessed section for receiving an animal's head to drink from said drinking tray;

c) means for supplying water from said tank to said drinking tray;

d) a float valve for controlling the supply of water from said tank to said drinking tray;

e) said tank being shaped so as to be nestable with another tank and including a first pair of spaced-apart nesting members formed on said first sidewall of said tank, and a second pair of spaced apart nesting members formed on said second pairs of nesting members each having nesting surfaces on their lower edges for engaging and resting on said upper rim of another tank in order to allows said tank to nest within another tank and to space the rims of the tanks apart a predetermined amount;

f) interior space of said upper rim of said tank defining a first channel therein along said first sidewall extending between at least said first pair o spaced-apart nesting members; and said interior space of said upper rim of said tank defining a second channel therein along said second sidewall extending between at least said second pair of spaced-apart nesting members;

g) said first channel having disposed in said interior space of said upper rim a first longitudinal support member extending between at least said first pair of spaced-apart nesting members and being adjacent to said first sidewall of said tank in order to provide increased structural integrity and nestability of said tank when nesting two or more of said tanks with each other;

h) said second channel having disposed in said interior space of said upper rim a second longitudinal support member extending between at least said second pair of nesting members and being adjacent to said second sidewall of said tank in order to provide increased structural integrity and nestability of said tank when nesting two or more of said tanks with each other; and i) said first and second longitudinal support members are mounted to said first and second sidewalls, respectively, of said tank by rivets, screws or bolts.

14. A livestock watering tank in accordance with claim 13, wherein said first longitudinal support member is mounted within said first channel, and wherein said second longitudinal support member is mounted within said second channel.

15. A livestock watering tank in accordance with claim 13, wherein said first longitudinal support member is molded within said first channel, and wherein said second longitudinal support member is molded within said second channel.

16. A livestock watering tank in accordance with claim 13, wherein said first and second longitudinal support members are mounted to said upper rim by rivets, screws or bolts.

17. A livestock watering tank in accordance with claim 13, wherein each of said first and second longitudinal support members is a pipe member.

18. A livestock watering tank in accordance with claim 13, wherein each of said first and second longitudinal support members is a bar-shaped member.

19. A livestock watering tank in accordance with claim 13, wherein each of said first and second longitudinal support members includes a geometrically-shaped member selected from the group consisting of a rectangularly-shaped member, a square-shaped member and ovally-shaped member.

20. A livestock watering tank in accordance with claim 13, wherein each of said first and second longitudinal support members includes a geometrically-shaped member selected from the group consisting of a rectangularly-shaped member, a square-shaped member and ovally-shaped member.

21. A livestock watering tank in accordance with claim 13, wherein each of said first and second longitudinal support members are made form rigid and heavy duty plastic materials selected from the group consisting of polypropylene, polyethylene teflon and nylon.

22. A livestock watering tank in accordance with claim 13, wherein each of said first and second longitudinal support members are made from rust resistant metal alloy materials selected from the group consisting of steel, stainless steel and aluminum.

23. A livestock watering tank in accordance with claim 13, wherein each of said first and second longitudinal support members has a length in the range 36 inches to 48 inches.

24. A livestock watering tank in accordance with claim 13, wherein said tank and said drinking tray are made from moldable plastic materials selected from the group consisting of polyethylene or structural foam.

* * * * *